(12) United States Patent
Chang (10) Patent No.: US 8,398,290 B2
(45) Date of Patent: Mar. 19, 2013

(54) LIGHT GUIDE MODULE OF SCANNING APPARATUS

(75) Inventor: Yu-Cheng Chang, Taipei (TW)

(73) Assignee: Primax Electronics, Ltd., Taipei (TW)

( * ) Notice: Subject to any disclaimer, the term of this patent is extended or adjusted under 35 U.S.C. 154(b) by 74 days.

(21) Appl. No.: 13/086,849

(22) Filed: Apr. 14, 2011

(65) Prior Publication Data

US 2012/0182756 A1    Jul. 19, 2012

(30) Foreign Application Priority Data

Jan. 14, 2011  (TW) .............................. 100101402 A (51) Int. Cl.
 *F21V 7/04* (2006.01)
(52) U.S. Cl. ..................... 362/613; 362/623
(58) Field of Classification Search .................. 362/603, 362/606–607, 612–613, 615–616, 623, 628, 362/631, 97.1–97.3, 555
See application file for complete search history.

(56) References Cited

U.S. PATENT DOCUMENTS

| 2006/0239034 | A1* | 10/2006 | Keh et al. ...................... 362/613 |
| 2007/0076433 | A1* | 4/2007 | Kinoshita et al. ............. 362/615 |
| 2007/0086179 | A1* | 4/2007 | Chen et al. ...................... 362/27 |
| 2007/0177070 | A1* | 8/2007 | Liu et al. ........................ 349/61 |
| 2008/0239751 | A1* | 10/2008 | Chang ........................... 362/612 |

* cited by examiner

*Primary Examiner* — Julie Shallenberger
(74) *Attorney, Agent, or Firm* — Kirton McConkie; Evan R. Witt (57) ABSTRACT

A light guide module of a scanning apparatus includes plural side-emitting light emitting diodes and a light-guiding post, which are disposed on a circuit board. The light-guiding post has plural reflective structures corresponding to respective side-emitting light emitting diodes for receiving light beams from respective side-emitting light emitting diodes. A spacing interval between two of the side-emitting light emitting diodes at a middle portion of the circuit board is greater than a spacing interval between two of the side-emitting light emitting diodes at a side of the circuit board.

7 Claims, 5 Drawing Sheets

LIGHT GUIDE MODULE OF SCANNING APPARATUS

FIELD OF THE INVENTION

The present invention relates to a light guide module, and more particularly to a light guide module of a scanning apparatus for guiding light beams.

BACKGROUND OF THE INVENTION

Scanning apparatuses are widely used for scanning images of paper documents. The scanned images can be converted into electronic files, which are then stored, processed or spread. With the maturity of scanning technologies, the scanning apparatuses have experienced great growth and are now rapidly gaining in popularity.

Figure 1:
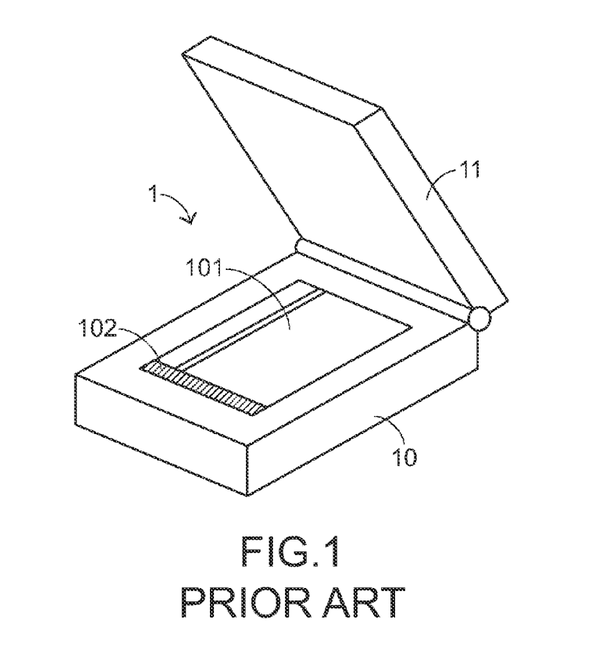
FIG. 1 is a schematic perspective view illustrating a conventional scanning apparatus.

FIG. 1 is a schematic perspective view illustrating a conventional scanning apparatus. As shown in FIG. 1, the conventional scanning apparatus 1 comprises a lower casing 10 and an upper cover 11. The lower casing 10 comprises a glass platform 101 and a scanning module 102. The glass platform 101 is used for scanning a to-be-scanned document P (see FIG. 2). After the document P is placed on the glass platform 101, the lower casing 10 is covered by the upper cover 11, so that the document P is positioned in the scanning apparatus 1. During the scanning operation is performed, the scanning module 102 is moved within the lower casing 10 to scan the document P.

Figure 2:
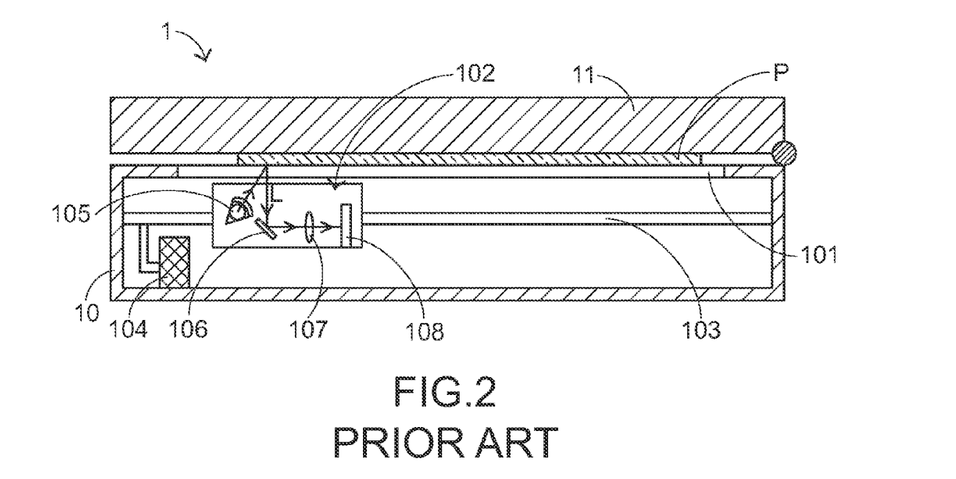
FIG. 2 is a schematic side view illustrating the conventional scanning apparatus.

Hereinafter, the internal structure of the lower casing 10 of the conventional scanning apparatus 1 will be illustrated with reference to FIG. 2. FIG. 2 is a schematic side view illustrating the conventional scanning apparatus. As shown in FIG. 2, in addition to the glass platform 101 and the scanning module 102, the lower casing 10 further comprises a transmission shaft 103 and a driving motor 104. The scanning module 102 is installed on the transmission shaft 103. The driving motor 104 is connected with the scanning module 102 for providing motive power to the scanning module 102, so that the scanning module 102 is moved along the transmission shaft 103. The scanning module 102 comprises a light guide module 105, a fixed reflective mirror 106, a lens 107 and an optical sensing element 108. The light guide module 105 is used for emitting light beams L and projecting the light beams L on the document P. The light guide module 105 is a lamp tube. The light beams L reflected by the document P are reflected by the fixed reflective mirror 106, and then focused by the lens 107. The focused light beams L are received by the optical sensing element 108, and then converted into corresponding image signals of the document P.

Hereinafter, a process for performing a scanning operation by the scanning apparatus 1 will be illustrated with reference to FIGS. 1 and 2. For scanning the document P by the scanning apparatus 1, the document P is firstly placed on the glass platform 101 of the lower casing 10. Then, the upper cover 11 is rotated toward the lower casing 10 to cover the lower casing 10 and fix the document P. After the document P is fixed, the scanning apparatus 1 is activated, and a scanning operation for scanning the document P starts. Meanwhile, the light guide module 105 of the scanning module 102 emits light beams L and projects the light beams L on the document P. The light beams L reflected by the document P are reflected by the fixed reflective mirror 106, and then focused by the lens 107. The focused light beams L are received by the optical sensing element 108, and thus a first portion of the image of the document P is acquired. Moreover, when the scanning apparatus 1 is activated, the driving motor 104 is enabled to drive movement of the scanning module 102 along the transmission shaft 103. That is, the overall document P is scanned while moving the scanning module 102 along the transmission shaft 103. After the scanning operation is finished, the complete image of the document P is acquired.

Figure 3:
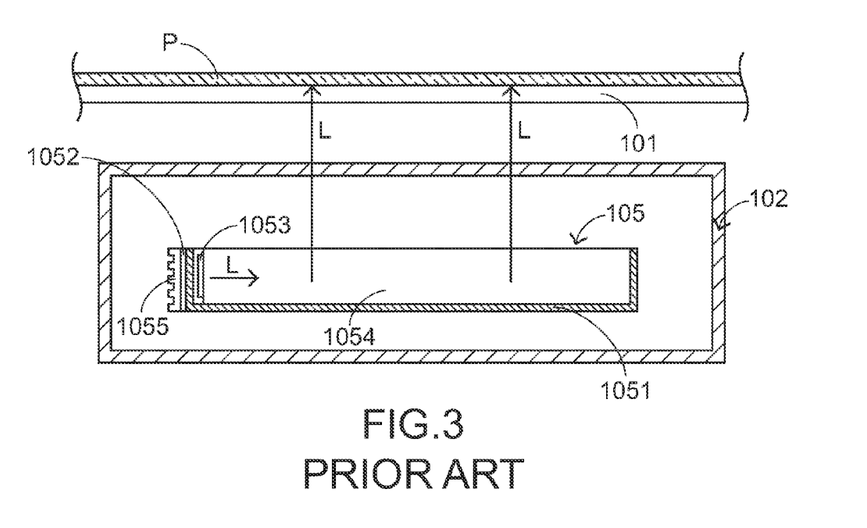
FIG. 3 is a schematic front view illustrating the light guide module of the conventional scanning apparatus.

Hereinafter, the structure of the light guide module 105 will be illustrated with reference to FIG. 3. FIG. 3 is a schematic front view illustrating the light guide module of the conventional scanning apparatus. The light guide module 105 comprises a base 1051, a circuit board 1052, a front-emitting LED (light emitting diode) 1053, a light-guiding bar 1054 and a heat sink 1055. The circuit board 1052 is disposed at a first end of the base 1051. The light-guiding bar 1054 is disposed on the base 1051. The front-emitting LED 1053 is mounted on the circuit board 1052 for emitting light beams L from the first end of the base 1051 and projecting the light beams L to the light-guiding bar 1054. The light beams L are guided by the light-guiding bar 1054 to be projected on the document P. The heat sink 1055 is disposed at the first end of the base 1051 for removing the heat that is generated from the front-emitting LED 1053 upon illumination.

Since only a single front-emitting LED 1053 is included in the light guide module 105, the front-emitting LED 1053 of the light guide module 105 is usually a high power LED for providing sufficiently bright light beams to scan the document P. However, since the front-emitting LED 1053 is a high power LED, the area of the heat sink 1055 should be large enough to dissipate the heat. Under this circumstance, the scanning apparatus 1 should provide a large space for accommodating the heat sink 1055. In other words, the large-sized heat sink 1055 is detrimental to miniaturization of the scanning apparatus 1.

After the plural light beams L emitted by the light guide module 105 are projected on the document P, the light beams L reflected by the middle portion of the document P are sequentially reflected by the fixed reflective mirror 106, focused by the lens 107, and received by the optical sensing element 108. Similarly, the light beams L reflected by the both edges of the document P are also sequentially reflected by the fixed reflective mirror 106, focused by the lens 107, and received by the optical sensing element 108. Generally, the quantity of the light beams L reflected by the middle portion of the document P to be received by the optical sensing element 108 is higher than the quantity of the light beams L reflected by the edges of the document P to be received by the optical sensing element 108. During the process of scanning the document P, since the both edges of the documents P are relatively darker, the scanning quality is deteriorated. That is, since the light beams L emitted by the light guide module 105 are not uniformly distributed, the light beams L fail to be uniformly received by the optical sensing element 108. Under this circumstance, the scanning quality of the scanning module 102 is impaired.

Therefore, there is a need of providing a light guide module for enhancing the scanning quality and reducing the volume of the scanning apparatus.

SUMMARY OF THE INVENTION

The present invention provides a light guide module of a scanning apparatus for enhancing the scanning quality.

The present invention also provides a light guide module of a scanning apparatus for reducing the volume of the scanning apparatus.

In accordance with an aspect of the present invention, there is provided a light guide module of a scanning apparatus. The light guide module includes a circuit board, plural side-emitting light emitting diodes and a light-guiding bar. The side-emitting light emitting diodes are mounted on the circuit board and arranged in a line for emitting respective light beams. The light-guiding bar is disposed on the circuit board and shelters the plural side-emitting light emitting diodes for guiding the light beams. The light-guiding bar includes plural reflective structures corresponding to the plural side-emitting light emitting diodes. In addition, the plural reflective structures are disposed on a bottom of the light-guiding bar for reflecting respective light beams. A spacing interval between two of the side-emitting light emitting diodes at a middle portion of the circuit board is greater than a spacing interval between two of the side-emitting light emitting diodes at a side of the circuit board.

In an embodiment, plural receptacles are defined between respective reflective structures and the circuit board for respectively accommodating corresponding side-emitting light emitting diodes. The light beams emitted by the side-emitting light emitting diodes are projected on and reflected by respective neighboring reflective structures.

In an embodiment, each of the reflective structures is an inclined reflective surface or a curvy reflective surface. Optionally, each of the reflective structures further includes plural reflective salient points, plural reflective pyramids, plural halftone dots or plural reflective recesses.

In an embodiment, each of the reflective structures is composed of plural reflective salient points, plural reflective pyramids, plural halftone dots or plural reflective recesses.

In an embodiment, the light-guiding bar further includes a middle reflective surface, wherein the middle reflective surface is arranged at a middle portion of the bottom of the light-guiding bar for reflecting the plural light beams.

In an embodiment, the light guide module further includes plural front-emitting light emitting diodes, which are respectively arranged at both edges of the circuit board for emitting front-emitting light beams.

In accordance with another aspect of the present invention, there is provided a light guide module of a scanning apparatus. The light guide module includes a circuit board, a first side-emitting light emitting diode, a second side-emitting light emitting diode, a third side-emitting light emitting diode, a fourth side-emitting light emitting diode and a light-guiding bar. The first side-emitting light emitting diode is mounted on the circuit board for emitting a first light beam. The second side-emitting light emitting diode is mounted on the circuit board and arranged at a first side of the first side-emitting light emitting diode for emitting a second light beam. The third side-emitting light emitting diode is mounted on the circuit board and arranged at a second side of the first side-emitting light emitting diode for emitting a third light beam. The fourth side-emitting light emitting diode is mounted on the circuit board and arranged at a second side of the third side-emitting light emitting diode for emitting a fourth light beam. The light-guiding bar is disposed on the circuit board and shelters the first side-emitting light emitting diode, the second side-emitting light emitting diode, the third side-emitting light emitting diode and the fourth side-emitting light emitting diode. The light-guiding bar is configured for guiding the first light beam, the second light beam, the third light beam and the fourth light beam. The light-guiding bar includes plural reflective structures corresponding to the first side-emitting light emitting diode, the second side-emitting light emitting diode, the third side-emitting light emitting diode and the fourth side-emitting light emitting diode. The reflective structures are disposed on a bottom of the light-guiding bar for reflecting the first light beam, the second light beam, the third light beam and the fourth light beam. A first spacing interval between the first light emitting diode and the second side-emitting light emitting diode is smaller than a second spacing interval between first side-emitting light emitting diode and the third side-emitting light emitting diode. The first spacing interval is equal to a third spacing interval between the third side-emitting light emitting diode and the fourth side-emitting light emitting diode.

In an embodiment, plural receptacles are defined between respective reflective structures and the circuit board for accommodating the first side-emitting light emitting diode, the second side-emitting light emitting diode, the third side-emitting light emitting diode and the fourth side-emitting light emitting diode, respectively.

In an embodiment, each of the reflective structures is an inclined reflective surface or a curvy reflective surface. Optionally, each of the reflective structures further comprises plural reflective salient points, plural reflective pyramids, plural halftone dots or plural reflective recesses.

In an embodiment, each of the reflective structures is composed of plural reflective salient points, plural reflective pyramids, plural halftone dots or plural reflective recesses.

In an embodiment, the light-guiding bar further includes a middle reflective surface. The middle reflective surface is arranged at a middle portion of the bottom of the light-guiding bar for reflecting the first light beam and the third light beam.

In an embodiment, the light guide module further includes a fifth side-emitting light emitting diode and a sixth side-emitting light emitting diode. The fifth side-emitting light emitting diode is mounted on the circuit board and arranged at a first side of the second side-emitting light emitting diode for emitting a fifth light beam. The sixth side-emitting light emitting diode is mounted on the circuit board and arranged at a second side of the fourth side-emitting light emitting diode for emitting a sixth light beam. A fourth spacing interval between the fifth side-emitting light emitting diode and the second side-emitting light emitting diode is smaller than the first spacing interval. The fourth spacing interval is equal to a fifth spacing interval between the fourth side-emitting light emitting diode and the sixth side-emitting light emitting diode.

In an embodiment, the light guide module further includes plural front-emitting light emitting diodes, which are respectively arranged at both edges of the circuit board for emitting front-emitting light beams.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 4:
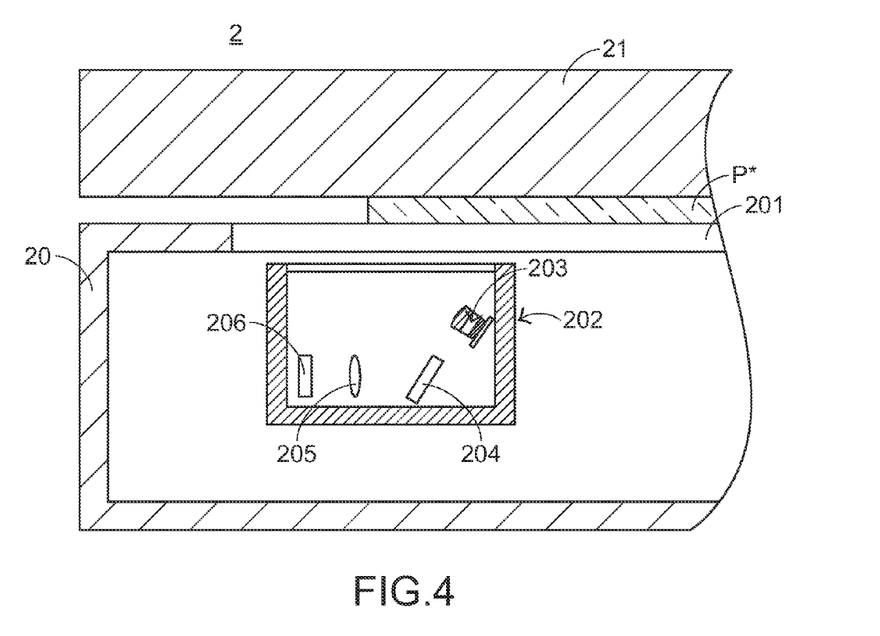
FIG. 4 is a schematic side view illustrating a light guide module of a scanning apparatus according to a first embodiment of the present invention.

For obviating the drawbacks encountered from the prior art, the present invention provides a light guide module of a scanning apparatus. FIG. 4 is a schematic side view illustrating a light guide module of a scanning apparatus according to a first embodiment of the present invention. As shown in FIG. 4, the scanning apparatus 2 comprises a lower casing 20 and an upper cover 21. The lower casing 20 comprises a glass platform 201 and a scanning module 202. The glass platform 201 is used for scanning a to-be-scanned document P*. During the scanning operation is performed, the scanning module 202 is moved within the lower casing 20 to scan the document P*. The scanning module 202 comprises a light guide module 203, a fixed reflective mirror 204, a lens 205 and an optical sensing element 206. The configurations and the functions of the light guide module 203, the fixed reflective mirror 204, the lens 205, the optical sensing element 206 and the moving mechanism of the scanning module 202 are similar to those of the conventional scanning apparatus, and are not redundantly described herein.

Figure 5:
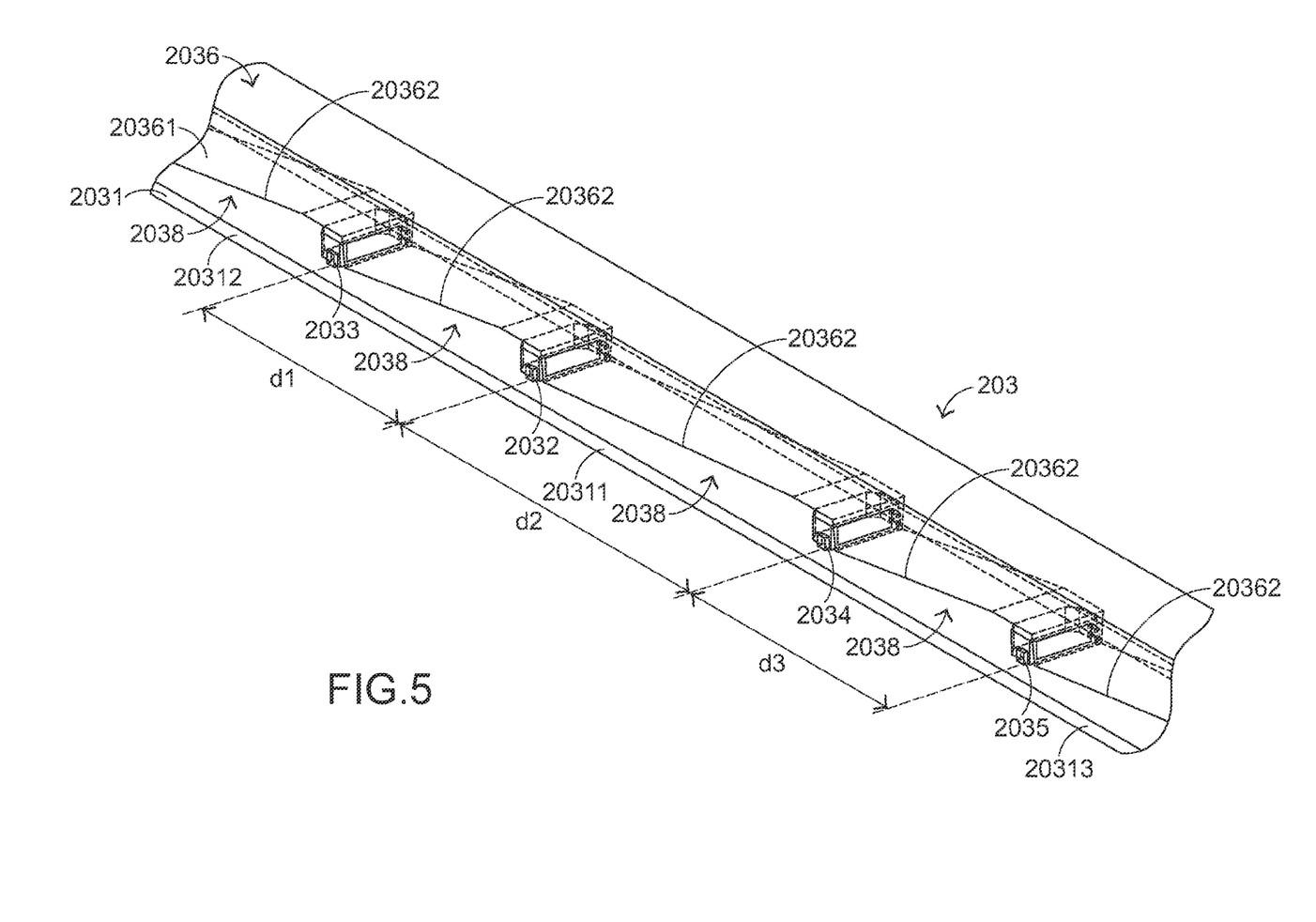
FIG. 5 is a schematic fragmentary view illustrating a light guide module of the scanning apparatus according to the first embodiment of the present invention.
Figure 6:
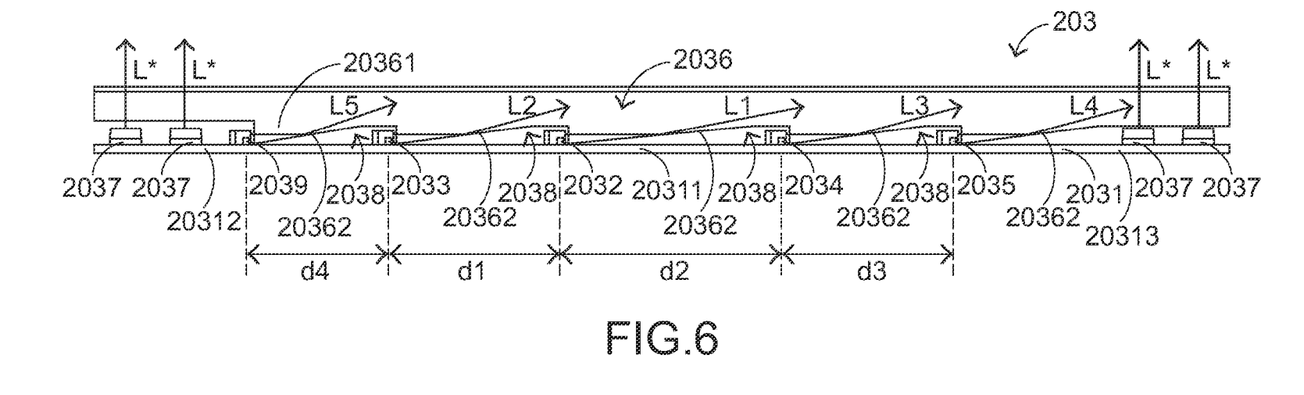
FIG. 6 is a schematic side view illustrating the light guide module of the scanning apparatus according to the first embodiment of the present invention.

Hereinafter, the structure of the light guide module 203 will be illustrated with reference to FIG. 5 and FIG. 6. FIG. 5 is a schematic fragmentary view illustrating a light guide module of the scanning apparatus according to the first embodiment of the present invention. FIG. 6 is a schematic side view illustrating the light guide module of the scanning apparatus according to the first embodiment of the present invention. The light guide module 203 comprises a circuit board 2031, a first side-emitting LED 2032, a second side-emitting LED 2033, a third side-emitting LED 2034, a fourth side-emitting LED 2035, a light-guiding bar 2036, plural front-emitting LEDs 2037 and a fifth side-emitting LED 2039.

Please refer to FIGS. 5 and 6 again. The first side-emitting LED 2032 is mounted on the circuit board 2031 for emitting a first light beam L1. The second side-emitting LED 2033 is mounted on the circuit board 2031 and arranged at a first side of the first side-emitting LED 2032 for emitting a second light beam L2. The third side-emitting LED 2034 is mounted on the circuit board 2031 and arranged at a second side of the first side-emitting LED 2032 for emitting a third light beam L3. The fourth side-emitting LED 2035 is mounted on the circuit board 2031 and arranged at a second side of the third side-emitting LED 2034 for emitting a fourth light beam L4. The fifth side-emitting LED 2039 is mounted on the circuit board 2031 and arranged at a first side of the second side-emitting LED 2033 for emitting a fifth light beam L5. That is, the fifth side-emitting LED 2039, the second side-emitting LED 2033, the first side-emitting LED 2032, the third side-emitting LED 2034 and the fourth side-emitting LED 2035 are sequentially arranged in a line. The first side-emitting LED 2032 and the third side-emitting LED 2034 are arranged at a middle portion 20311 of the circuit board 2031. The second side-emitting LED 2033 and the fifth side-emitting LED 2039 are arranged at a first side 20312 of the circuit board 2031. The fourth side-emitting LED 2035 is arranged at a second side 20313 of the circuit board 2031. The first side-emitting LED 2032 and the second side-emitting LED 2033 are separated from each other by a first spacing interval d1. The first side-emitting LED 2032 and the third side-emitting LED 2034 are separated from each other by a second spacing interval d2. The third side-emitting LED 2034 and the fourth side-emitting LED 2035 are separated from each other by a third spacing interval d3. The fifth side-emitting LED 2039 and the second side-emitting LED 2033 are separated from each other by a fourth spacing interval d4. The second spacing interval d2 is greater than the first spacing interval d1. The first spacing interval d1 is greater than the fourth spacing interval d4. In addition, the first spacing interval d1 is equal to the third spacing interval d3.

Please refer to FIGS. 5 and 6 again. The light-guiding bar 2036 is disposed on the circuit board 2031 and shelters the first side-emitting LED 2032, the second side-emitting LED 2033, the third side-emitting LED 2034, the fourth side-emitting LED 2035, the light-guiding bar 2036 and the fifth side-emitting LED 2039. The light-guiding bar 2036 is configured for guiding the first light beam L1, the second light beam L2, the third light beam L3, the fourth light beam L4 and the fifth light beam L5. The light-guiding bar 2036 comprises plural reflective structures 20362 corresponding to the first side-emitting LED 2032, the second side-emitting LED 2033, the third side-emitting LED 2034, the fourth side-emitting LED 2035, the light-guiding bar 2036 and the fifth side-emitting LED 2039. The reflective structures 20362 are disposed on a bottom 20361 of the light-guiding bar 2036 for reflecting the first light beam L1, the second light beam L2, the third light beam L3, the fourth light beam L4 and the fifth light beam L5. In this embodiment, the reflective structures 20362 are inclined slant surfaces. Moreover, the front-emitting LEDs 2037 are disposed on both edges of the circuit board 2031 for emitting a front-emitting light beam L*.

In the light guide module 203, plural receptacles 2031 are defined between respective reflective structures 20362 and the circuit board 2031 for accommodating the side-emitting LED of the first side-emitting LED 2032, the second side-emitting LED 2033, the third side-emitting LED 2034, the fourth side-emitting LED 2035, the light-guiding bar 2036 and the fifth side-emitting LED 2039, respectively.

For scanning the document P* by the scanning apparatus 2, the light guide module 203 is enabled to allow the first side-emitting LED 2032, the second side-emitting LED 2033, the third side-emitting LED 2034, the fourth side-emitting LED 2035, the light-guiding bar 2036, the fifth side-emitting LED 2039 and the front-emitting LEDs 2037 to emit the first light beam L1, the second light beam L2, the third light beam L3, the fourth light beam L4, the fifth light beam L5 and the front-emitting light beam L*, respectively. The first light beam L1, the second light beam L2, the third light beam L3, the fourth light beam L4 and the fifth light beam L5 are respectively projected to corresponding reflective structures 20362 (i.e. the inclined slant surfaces) of the light-guiding bar 2036. The first light beam L1, the second light beam L2, the third light beam L3, the fourth light beam L4 and the fifth light beam L5 are respectively reflected by the reflective structures 20362 and guided by the light-guiding bar 2036. Consequently, the light beams L1~L5 are projected on the document P*. On the other hand, the front-emitting light beam L* is guided by the light-guiding bar 2036 to be projected on the document P*.

The features of the light guide module 203 will be illustrated as follows. Firstly, the reflective structures 20362 of the light-guiding bar 2036 are used for reflecting the light beams L1~L5, so that the light beams L1~L5 can be uniformly scattered and uniformly projected on the document P*. Secondly, the second spacing interval d2 between two side-emitting LEDs at the middle portion 20311 of the circuit board 2031 is greater than the first spacing interval d1, the third spacing interval d3 or the fourth spacing interval d4 between two side-emitting LEDs at the first side (or the second side) of the circuit board 2031. In such way, the quantity of the light beams projected on both edges of the document P* will be increased. After the light beams L1~L5 and L* are reflected by the fixed reflective mirror 204 and focused by the lens 205, the light beams L1~L5 and L* can be uniformly received by the optical sensing element 206. Under this circumstance, the scanning quality is enhanced. Thirdly, the light guide module 203 further comprises plural front-emitting LEDs at both edges of the circuit board 2031 to increase the quantity of the light beams projected onto both edges of the document P*, thereby further enhancing the scanning quality.

Figure 7:
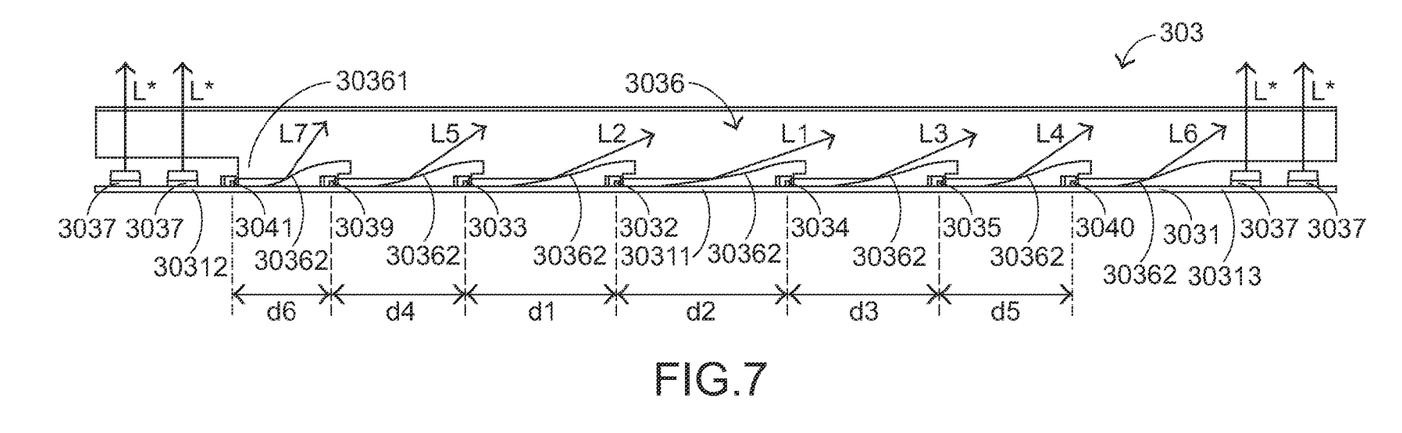
FIG. 7 is a schematic side view illustrating a light guide module of a scanning apparatus according to a second embodiment of the present invention.

FIG. 7 is a schematic side view illustrating a light guide module of a scanning apparatus according to a second embodiment of the present invention. The light guide module 303 comprises a circuit board 3031, a first side-emitting LED 3032, a second side-emitting LED 3033, a third side-emitting LED 3034, a fourth side-emitting LED 3035, a light-guiding bar 3036, plural front-emitting LEDs 3037, a fifth side-emitting LED 3039, a sixth side-emitting LED 3040 and a seventh side-emitting LED 3041. The sequence of arranging the first side-emitting LED 3032, the second side-emitting LED 3033, the third side-emitting LED 3034, the fourth side-emitting LED 3035 and the fifth side-emitting LED 303 and the relationships between the first spacing interval d1, the second spacing interval d2, the third spacing interval d3 and the fourth spacing interval d4 are similar to those of the light guide module of the first embodiment, and are not redundantly described herein.

Except for the following features, the configurations and the functions of the light guide module 303 are similar to those of the light guide module of the first embodiment, and are not redundantly described herein. Firstly, in comparison with the first embodiment, the light guide module 303 further comprises the sixth side-emitting LED 3040 and the seventh side-emitting LED 3041. The seventh side-emitting LED 3041 is mounted on the circuit board 3031 and arranged at a first side of the fifth side-emitting LED 2039 (i.e. the first side 30312 of the circuit board 3031) for emitting a seventh light beam L7. The sixth side-emitting LED 304 is mounted on the circuit board 3031 and arranged at a second side of the fourth side-emitting LED 3035 (i.e. the second side 30313 of the circuit board 3031) for emitting a sixth light beam L6. Since the sixth side-emitting LED 3040 and the seventh side-emitting LED 3041 are additionally mounted on the circuit board 3031, the seventh side-emitting LED 3041 and the fifth side-emitting LED 3039 are separated from each other by a sixth spacing interval d6, and the fourth side-emitting LED 3035 and the sixth side-emitting LED 3040 are separated from each other by a fifth spacing interval d5. The second spacing interval d2 is greater than the first spacing interval d1. The first spacing interval d1 is greater than the fourth spacing interval d4. The fourth spacing interval d4 is greater than the sixth spacing interval d6. In addition, the first spacing interval d1 is equal to the third spacing interval d3, and the fourth spacing interval d4 is equal to the fifth spacing interval d5.

Secondary, the reflective structures 30362 disposed on the bottom 30361 of the light-guiding bar 3036 are curvy reflective surfaces for reflecting the light beams L1~L7. In comparison with the reflective structures 30362 (i.e. the inclined slant surfaces), the reflective structures 30362 have different reflectivity for reflecting the light beams L1~L7 in a different scattering effect.

Figures 8, 9:
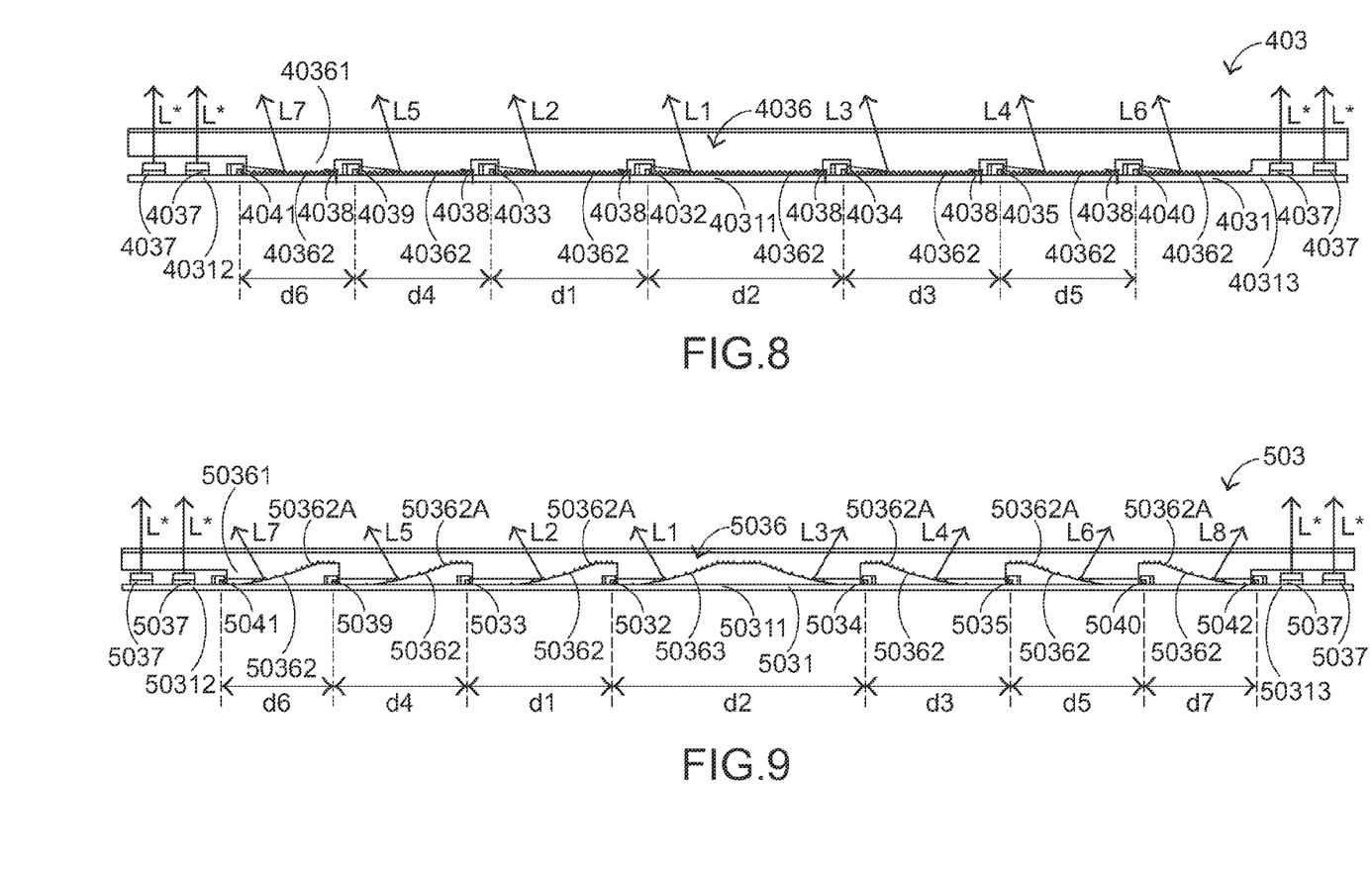
FIG. 8 is a schematic side view illustrating a light guide module of a scanning apparatus according to a third embodiment of the present invention.
FIG. 9 is a schematic side view illustrating a light guide module of a scanning apparatus according to a fourth embodiment of the present invention.

FIG. 8 is a schematic side view illustrating a light guide module of a scanning apparatus according to a third embodiment of the present invention. The light guide module 403 comprises a circuit board 4031, a first side-emitting LED 4032, a second side-emitting LED 4033, a third side-emitting LED 4034, a fourth side-emitting LED 4035, a light-guiding bar 4036, plural front-emitting LEDs 4037, a fifth side-emitting LED 4039, a sixth side-emitting LED 4040 and a seventh side-emitting LED 4041.

Except for the following features, the configurations and the functions of the light guide module 403 are similar to those of the light guide module of the second embodiment, and are not redundantly described herein. For example, each of the reflective structures 40362 on the bottom 40361 of the light-guiding bar 4036 includes plural salient points for reflecting the light beams L1~L7, wherein the seventh light beam L7 is emitted by the seventh side-emitting LED 4041. In comparison with the reflective structures of the second embodiment (i.e. the curvy reflective surfaces), the reflective structures 40362 have different reflectivity for reflecting the light beams L1~L7 in a different scattering effect.

In this embodiment, the use of the salient points as the reflective structure may increase the efficacy of reflecting and scattering light beams. Alternatively, each of the reflective structures of the light guide module may include plural reflective pyramids, plural halftone dots or plural reflective recesses for reflecting and scattering light beams. In the light guide module 403 of this embodiment, plural receptacles 4038 are defined between respective reflective structures 40362 (i.e. the salient points) and the circuit board 4031 for accommodating the side-emitting LED of the first side-emitting LED 4032, the second side-emitting LED 4033, the third side-emitting LED 4034, the fourth side-emitting LED 4035, the light-guiding bar 4036, the fifth side-emitting LED 4039, the sixth side-emitting LED 4040 and the seventh side-emitting LED 4041, respectively. Depending on the reflective structures 40362, the shapes of the receptacles 4038 may be modified as required.

FIG. 9 is a schematic side view illustrating a light guide module of a scanning apparatus according to a fourth embodiment of the present invention. The light guide module 503 comprises a circuit board 5031, a first side-emitting LED 5032, a second side-emitting LED 5033, a third side-emitting LED 5034, a fourth side-emitting LED 5035, a light-guiding bar 5036, plural front-emitting LEDs 5037, a fifth side-emitting LED 5039, a sixth side-emitting LED 5040, a seventh side-emitting LED 5041 and an eighth side-emitting LED 5042.

Except for the following features, the configurations and the functions of the light guide module 503 are similar to those of the light guide module of the second embodiment, and are not redundantly described herein. For example, in the light guide module 503, the eighth side-emitting LED 5042 is additionally mounted on the circuit board 5031. The light-guiding bar 5036 further comprises a middle reflective surface 50363, which is arranged at a middle portion of a bottom 50361 of the light-guiding bar 5036. In this embodiment, the reflective structures 50362 are curvy reflective surfaces. The reflective structures 50362 are (i.e. the curvy reflective surfaces) are disposed on the circuit board 5031 and arranged at both sides of the middle reflective surface 50363. The first side-emitting LED 5032 and the third side-emitting LED 5034 are arranged at a middle portion 50311 of the circuit board 5031. The second side-emitting LED 5033, the fifth side-emitting LED 5039 and the seventh side-emitting LED 5041 are arranged at a first side 50312 of the circuit board 5031. The fourth side-emitting LED 5035, the sixth side-emitting LED 5040 and the eighth side-emitting LED 5042 are arranged at a second side 50313 of the circuit board 5031. The reflective structures 50362 corresponding to the first side-emitting LED 5032, the second side-emitting LED 5033, the fifth side-emitting LED 5039 and the seventh side-emitting LED 5041 face the first side 50312 of the circuit board 5031 (i.e. the left side as shown in FIG. 9). The reflective structures 50362 corresponding to the third side-emitting LED 5034, the fourth side-emitting LED 5035, the sixth side-emitting LED 5040 and the eighth side-emitting LED 5042 face the second side 50313 of the circuit board 5031 (i.e. the right side as shown in FIG. 9).

By means of the light-guiding bar 5036, the first light beam L1 and the third light beam L3 emitted by the first side-emitting LED 5032 and the third side-emitting LED 5034 are respectively projected on the middle reflective surface 50363, so that the first light beam L1 and the third light beam L3 are reflected by the middle reflective surface 50363. In this embodiment, each of the reflective structures 50362 of the light-guiding bar 5036 further comprises plural reflective recesses 50362A for facilitating reflecting the light beams L1~L8, wherein the eighth light beam L8 is emitted by the eighth side-emitting LED 5042. The reflective recesses 50362A are formed in the curvy reflective surface of a corresponding reflective structure 50362. The arrangement of the reflective recesses 50362A may increase the efficacy of scattering light beams, and thus enhance the effect of homogenizing the light beams. This embodiment is illustrated by referring to the reflective recesses 50362A. Nevertheless, the each of the reflective structures 50362 may further comprises plural reflective salient points, plural reflective pyramids or plural halftone dots. Alternatively, in some embodiments, the reflective structures 50362 are inclined reflective surface.

From the above description, the light guide module of the scanning apparatus of the present invention has plural reflective structures at the bottom of the light-guiding bar. In addition, by elaborately determining the spacing interval between every two adjacent side-emitting LEDs, the spacing interval between two of the side-emitting light emitting diodes at a middle portion of the circuit board is greater than the spacing interval between two of the side-emitting light emitting diodes at a side of the circuit board. By this light guide module, the effect of homogenizing the light beams is increased, and the scanning quality is enhanced. Moreover, the side-emitting LEDs and the front-emitting LEDs used in the light guide module of the scanning apparatus are low power LEDs. Although more than two low power LEDs are mounted on the circuit board, the light guide module with plural low power LEDs according to the present invention is more cost-effective than the conventional light guide module with two high power LEDs. In other words, the fabricating cost of the light guide module of the present invention is reduced then compared with the conventional light guide module.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A light guide module of a scanning apparatus, said light guide module comprising:
   a circuit board;
   a first side-emitting light emitting diode mounted on said circuit board for emitting a first light beam;
   a second side-emitting light emitting diode mounted on said circuit board and arranged at a first side of said first side-emitting light emitting diode for emitting a second light beam;
   a third side-emitting light emitting diode mounted on said circuit board and arranged at a second side of said first side-emitting light emitting diode for emitting a third light beam;
   a fourth side-emitting light emitting diode mounted on said circuit board and arranged at a second side of said third side-emitting light emitting diode for emitting a fourth light beam;
   a light-guiding bar disposed on said circuit board and sheltering said first side-emitting light emitting diode, said second side-emitting light emitting diode, said third side-emitting light emitting diode and said fourth side-emitting light emitting diode for guiding said first light beam, said second light beam, said third light beam and said fourth light beam, wherein said light-guiding bar comprises a plurality of reflective structures corresponding to said first side-emitting light emitting diode, said second side-emitting light emitting diode, said third side-emitting light emitting diode and said fourth side-emitting light emitting diode, said reflective structures are disposed on a bottom of said light-guiding bar for reflecting said first light beam, said second light beam, said third light beam and said fourth light beam, wherein a first spacing interval between said first light emitting diode and said second side-emitting light emitting diode is smaller than a second spacing interval between first side-emitting light emitting diode and said third side-emitting light emitting diode, and said first spacing interval is equal to a third spacing interval between said third side-emitting light emitting diode and said fourth side-emitting light emitting diode; and
   a fifth side-emitting light emitting diode mounted on said circuit board and arranged at a first side of said second side-emitting light emitting diode for emitting a fifth light beam; and
   a sixth side-emitting light emitting diode mounted on said circuit board and arranged at a second side of said fourth side-emitting light emitting diode for emitting a sixth light beam, wherein a fourth spacing interval between said fifth side-emitting light emitting diode and said second side-emitting light emitting diode is smaller than said first spacing interval, and said fourth spacing interval is equal to a fifth spacing interval between said fourth side-emitting light emitting diode and said sixth side-emitting light emitting diode.

2. The light guide module according to claim 1 wherein a plurality of receptacles are defined between respective reflective structures and said circuit board for accommodating said first side-emitting light emitting diode, said second side-emitting light emitting diode, said third side-emitting light emitting diode and said fourth side-emitting light emitting diode, respectively.

3. The light guide module according to claim 1 wherein each of said reflective structures is an inclined reflective surface or a curvy reflective surface.

4. The light guide module according to claim 3 wherein each of said reflective structures further comprises a plurality of reflective salient points, a plurality of reflective pyramids, a plurality of halftone dots or a plurality of reflective recesses.

5. The light guide module according to claim 1 wherein each of said reflective structures is composed of a plurality of reflective salient points, a plurality of reflective pyramids, a plurality of halftone dots or a plurality of reflective recesses.

6. The light guide module according to claim 1 wherein said light-guiding bar further comprises a middle reflective surface, wherein said middle reflective surface is arranged at a middle portion of said bottom of said light-guiding bar for reflecting said first light beam and said third light beam.

7. The light guide module according to claim 1 further comprising a plurality of front-emitting light emitting diodes, which are respectively arranged at both edges of said circuit board for emitting front-emitting light beams.

* * * * *